United States Patent
Miyagawa

(10) Patent No.: US 10,525,900 B2
(45) Date of Patent: Jan. 7, 2020

(54) VEHICLE PERIPHERY MONITORING DEVICE

(71) Applicant: HONDA MOTOR CO., LTD., Minato-ku, Tokyo (JP)

(72) Inventor: Keisuke Miyagawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 33 days.

(21) Appl. No.: 15/315,251

(22) PCT Filed: Mar. 9, 2015

(86) PCT No.: PCT/JP2015/056823
§ 371 (c)(1),
(2) Date: Nov. 30, 2016

(87) PCT Pub. No.: WO2015/186395
PCT Pub. Date: Dec. 10, 2015

(65) Prior Publication Data
US 2017/0190301 A1    Jul. 6, 2017

(30) Foreign Application Priority Data

Jun. 3, 2014    (JP) .................................. 2014-115171

(51) Int. Cl.
*B60R 11/04*    (2006.01)
*G08G 1/16*    (2006.01)
(Continued)

(52) U.S. Cl.
CPC ............. *B60R 11/04* (2013.01); *B60Q 9/008* (2013.01); *B60R 1/00* (2013.01); *B60R 21/00* (2013.01);
(Continued)

(58) Field of Classification Search
CPC ........... B60R 11/04; B60R 1/00; B60R 21/00; B60R 21/0134; B60R 2300/302;
(Continued)

(56) References Cited

U.S. PATENT DOCUMENTS

2007/0229238 A1* 10/2007 Boyles ............... G06K 9/00369
340/435
2007/0291987 A1* 12/2007 Saka .................. G06K 9/00369
382/103
(Continued)

FOREIGN PATENT DOCUMENTS

EP    2 288 138 A1    2/2011
JP    2006-338611 A    12/2006
(Continued)

OTHER PUBLICATIONS

Office Action dated Aug. 8, 2017 issued in the counterpart Japanese patent application 2016-525715.

*Primary Examiner* — Thai Q Tran
*Assistant Examiner* — Nienru Yang
(74) *Attorney, Agent, or Firm* — Carrier Blackman & Associates, P.C.; Joseph P. Carrier; Jeffrey T. Gedeon

(57) ABSTRACT

Provided is a vehicle periphery monitoring device that can appropriately recognize a monitored subject that is present at a periphery of a vehicle and notify a driver, while suppressing computational amount and the amount of memory usage. In a case where a monitored subject W detected in a past captured image is not detected in a latest captured image (NO in FIG. 2B/STEP 7), an alert process unit 13 to 16 estimates whether or not the monitored subject W is present in a notification region D2 in a real space based on the past captured image (FIG. 2B/STEP 11 to FIG. 2B/STEP 13 and FIG. 2B/STEP 15 to FIG. 2B/STEP 16) and notifies the (Continued)

driver when the monitored subject W is estimated to be present in the notification region D2 (FIG. 2B/STEP 14).

7 Claims, 4 Drawing Sheets

(51) Int. Cl.
    *B60Q 9/00*     (2006.01)
    *B60R 1/00*     (2006.01)
    *B60R 21/0134*     (2006.01)
    *B60W 30/08*     (2012.01)
    *G06T 3/00*     (2006.01)
    *G08B 21/00*     (2006.01)
    *B60R 21/00*     (2006.01)
    *G06K 9/00*     (2006.01)

(52) U.S. Cl.
    CPC ......... *B60R 21/0134* (2013.01); *B60W 30/08* (2013.01); *G06T 3/00* (2013.01); *G08B 21/00* (2013.01); *G08G 1/16* (2013.01); *G08G 1/166* (2013.01); *B60R 2300/302* (2013.01); *B60R 2300/307* (2013.01); *B60R 2300/70* (2013.01); *B60R 2300/8033* (2013.01); *G06K 9/00805* (2013.01)

(58) Field of Classification Search
    CPC .......... B60R 2300/307; B60R 2300/70; B60R 2300/8033; B60Q 9/008; B60W 30/08; G06T 3/00; G08B 21/00; G08G 1/16; G08G 1/166; G06K 9/00805
    USPC .......................................................... 348/148
    See application file for complete search history.

(56) References Cited

U.S. PATENT DOCUMENTS

2012/0133769 A1* 5/2012 Nagamine ................. B60R 1/00
    348/148
2012/0327236 A1* 12/2012 Kiyohara ........... G06K 9/00369
    348/148
2013/0093887 A1* 4/2013 Wu .................... G06K 9/00805
    348/148

FOREIGN PATENT DOCUMENTS

| JP | 2008-021034 A | 1/2008 |
| JP | 2008-186170 A | 8/2008 |
| JP | 2009-276200 A | 11/2009 |
| JP | 2014-004897 A | 1/2014 |
| JP | 2014-006700 A | 1/2014 |
| JP | 2014-048978 A | 3/2014 |

\* cited by examiner

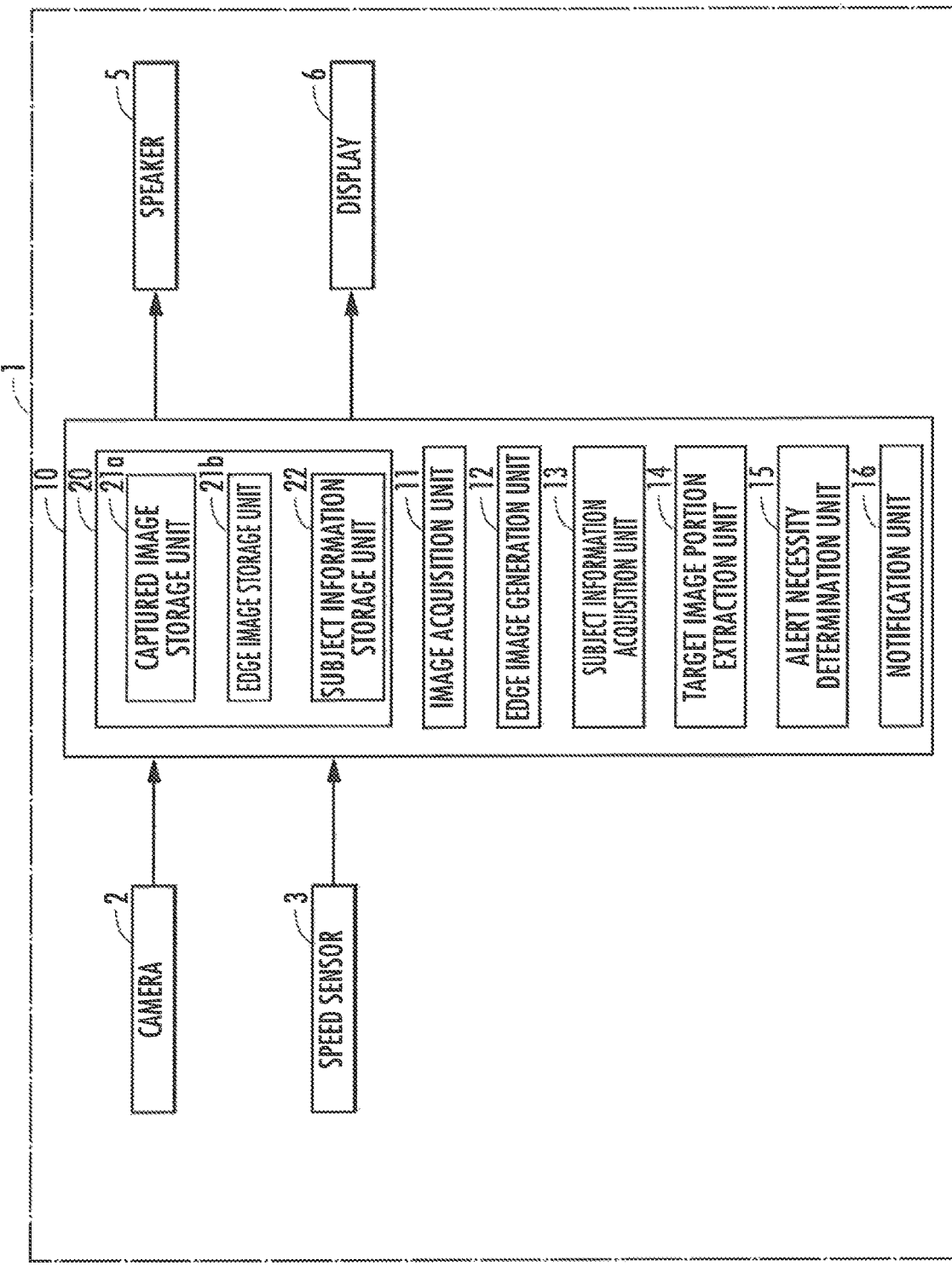

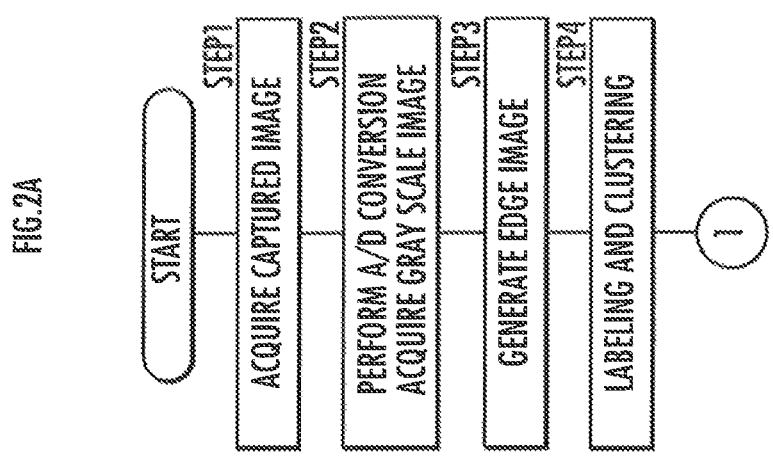

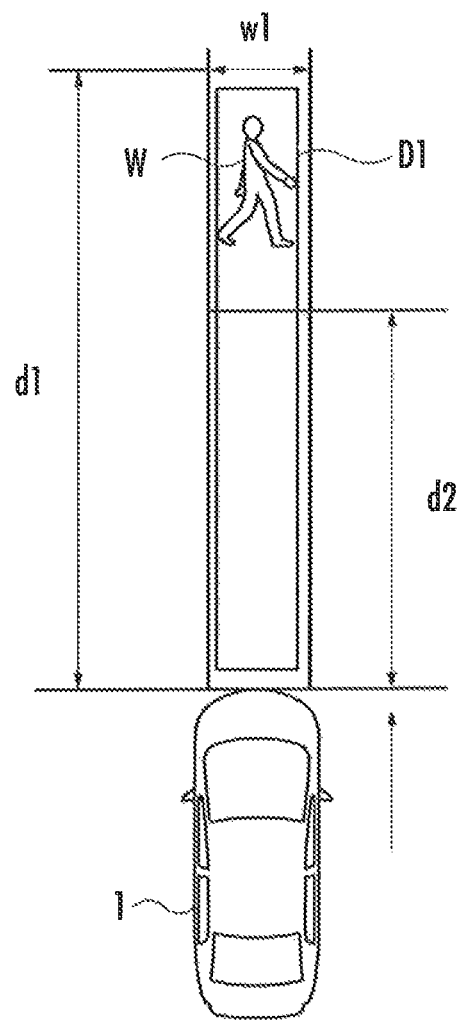
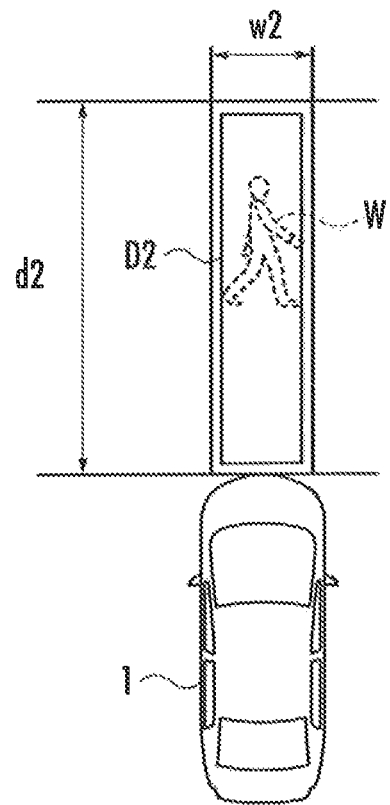

VEHICLE PERIPHERY MONITORING DEVICE

TECHNICAL FIELD

The present invention relates to a vehicle periphery monitoring device that monitors the periphery of a vehicle.

BACKGROUND ART

There have been known vehicle periphery monitoring devices that detect a monitored subject that is present around an own vehicle from a captured image acquired using an on-board camera and notifies a driver that the monitored subject is present around the own vehicle.

In a vehicle periphery monitoring device of this type, the shape of an image portion of a subject (e.g., pedestrian) or the like that is detected from a captured image may change in accordance with a distance between a camera and the subject. For example, when a pedestrian is present at a position of a predetermined distance or more from the camera, a whole-body image of the pedestrian may be captured, while when a pedestrian is present within the predetermined distance from the camera, only the head of the pedestrian may be captured. In such a case, when a recognition process is performed on the pedestrian using feature quantities of the whole-body image of the pedestrian, there is a risk that an image portion of only the head is not recognized to be of the pedestrian. As a result, even though a monitored subject such as a pedestrian is present around an own vehicle, there is a risk that the driver is not notified of the fact.

In view of such a problem, there is proposed an image recognition device that performs, on an image portion of an object being a distinction target in a captured image, comparison of an image portion with a pattern of a specified part of a predetermined object (e.g., the head of a pedestrian), with respect to the image portion not having been recognized to be of the pedestrian in comparison with a pattern of the whole of the predetermined object (e.g., the whole body of a pedestrian) (e.g., see Patent Literature 1).

CITATION LIST

Patent Literature

Patent Literature 1: Japanese Patent Application Laid-Open No. 2008-21034

SUMMARY OF INVENTION

Technical Problem

However, with the technique of Patent Literature 1, an image portion of a subject that may be a distinction target is subjected to comparison with the whole pattern and to comparison with the pattern of a specified part, which may thus increase computational amount or the amount of memory usage.

The present invention is made in view of such a circumstance and has an objective to provide a vehicle periphery monitoring device that can appropriately recognize a monitored subject that is present in a periphery of a vehicle and can notify a driver of the monitored subject, while suppressing computational complexity and the amount of memory usage.

Solution to Problem

The present invention is made to achieve the above objective and relates to a vehicle periphery monitoring device that detects a monitored subject from captured images at a plurality of time points of the periphery of an own vehicle acquired using a camera, and notifies a driver of the own vehicle that the monitored subject is present in the periphery of the own vehicle, and relates to a vehicle, and a vehicle periphery monitoring method.

A vehicle periphery monitoring device of the present invention includes an alert process unit which, in a case where the monitored subject detected in a past captured image is not detected in a latest captured image, estimates whether or not the monitored subject is present in a notification region in a real space based on the past captured image, and notifies the driver when the monitored subject is estimated to be present in the notification region.

According to the vehicle periphery monitoring device having the configuration, even if a monitored subject is not detected from a latest captured image, a notification is provided to a driver when it is estimated based on a past captured image that the monitored subject is present in a notification region. As a result, the analysis of a latest captured image to detect the undetected subject becomes unnecessary, and it is thus possible to appropriately notify the driver of the presence of the monitored subject while suppressing computational amount and the amount of memory usage.

In the vehicle periphery monitoring device of the present invention, the alert process unit preferably estimates that the monitored subject is present in the notification region in a case at least one of requirements is satisfied between a requirement that a distance in the traveling direction of the own vehicle between the monitored subject detected from the past captured image and the own vehicle is a predetermined first distance or less; and a requirement that a distance in the width direction of the own vehicle between the monitored subject and the own vehicle is a predetermined second distance or less.

According to the vehicle periphery monitoring device having the configuration, as to a monitored subject that is present in the vicinity of the own vehicle at a past image capture time point, the monitored subject is estimated to be present in the notification region at a latest image capture time point, and it is thus possible to notify the driver of the presence of the monitored subject more appropriately.

In the vehicle periphery monitoring device of the present invention, the alert process unit estimates that the monitored subject is present in the notification region in a case the number of times at which the monitored subject is detected from a captured image is a predetermined number of times or more in a past predetermined time period.

According to the vehicle periphery monitoring device having the configuration, since the monitored subject is estimated to be present in the notification region in the case where the number of times at which a monitored subject is detected from a captured image is the predetermined number of times or more in the past predetermined time period, a notification is provided when there is a high probability that the monitored subject is actually present in the notification region. Therefore, according to the vehicle periphery monitoring device having the configuration, it is possible to notify a driver of the presence of the monitored subject more appropriately.

In the vehicle periphery monitoring device of the present invention, the alert process unit preferably estimates that the monitored subject is present in the notification region in a case a time elapsed since the monitored subject becomes undetectable is a predetermined time period or less.

Even when the monitored subject has been detected in the past, the probability of the presence of the monitored subject in the notification region decreases with elapse of time. According to the vehicle periphery monitoring device having the configuration that is made with this regard brought into focus, when the time elapsed since the monitored subject becomes undetectable is the predetermined time period or less, the monitored subject is estimated to be present in the notification region. Accordingly, it is estimated with high accuracy whether or not the monitored subject is present in the notification region.

In the vehicle periphery monitoring device of the present invention, the alert process unit preferably estimates whether or not the monitored subject is currently present in the notification region based on the relative speed of the monitored subject detected in the past captured image with respect to the own vehicle.

According to the vehicle periphery monitoring device having the configuration, it is estimated, based on the relative speed to the vehicle, whether or not the monitored subject is present in the notification region. As a result, even if the monitored subject is a moving object, it is estimated whether or not the monitored subject is present in the notification region, with high accuracy.

A vehicle of the present invention includes an alert process unit which, in a case where the monitored subject detected in a past captured image becomes undetectable from a latest captured image, estimates whether or not the monitored subject is present in a notification region in a real space based on the past captured image, and that notifies the driver when the monitored subject is estimated to be present in the notification region.

According to the vehicle of the present invention, it is possible to obtain the same operational advantages as with the above-described vehicle periphery monitoring device of the present invention.

A vehicle periphery monitoring method of the present invention including an alert process step of, in a case where the monitored subject detected in a past captured image is not detected in a latest captured image, estimating whether or not the monitored subject is present in a notification region in a real space based on the past captured image, and notifying the driver when the monitored subject is estimated to be present in the notification region.

By implementing the vehicle periphery monitoring method of the present invention through applying the method to a vehicle, it is possible to obtain the same operational advantages as those of the above-described vehicle periphery monitoring device of the present invention.

BRIEF DESCRIPTION OF DRAWINGS

FIG. 1 is a configuration diagram of a vehicle periphery monitoring device.

FIG. 2A and FIG. 2B are flowcharts of vehicle periphery monitoring processing.

FIG. 3A and FIG. 3B are diagrams in which FIG. 3A illustrates a past positional relationship in a real space between a subject and a vehicle in the case where the subject has been detected in the past, and FIG. 3B illustrates a current positional relationship in the real space between the subject and the vehicle in the case where the subject is undetectable.

DESCRIPTION OF EMBODIMENTS

Figure 2B:
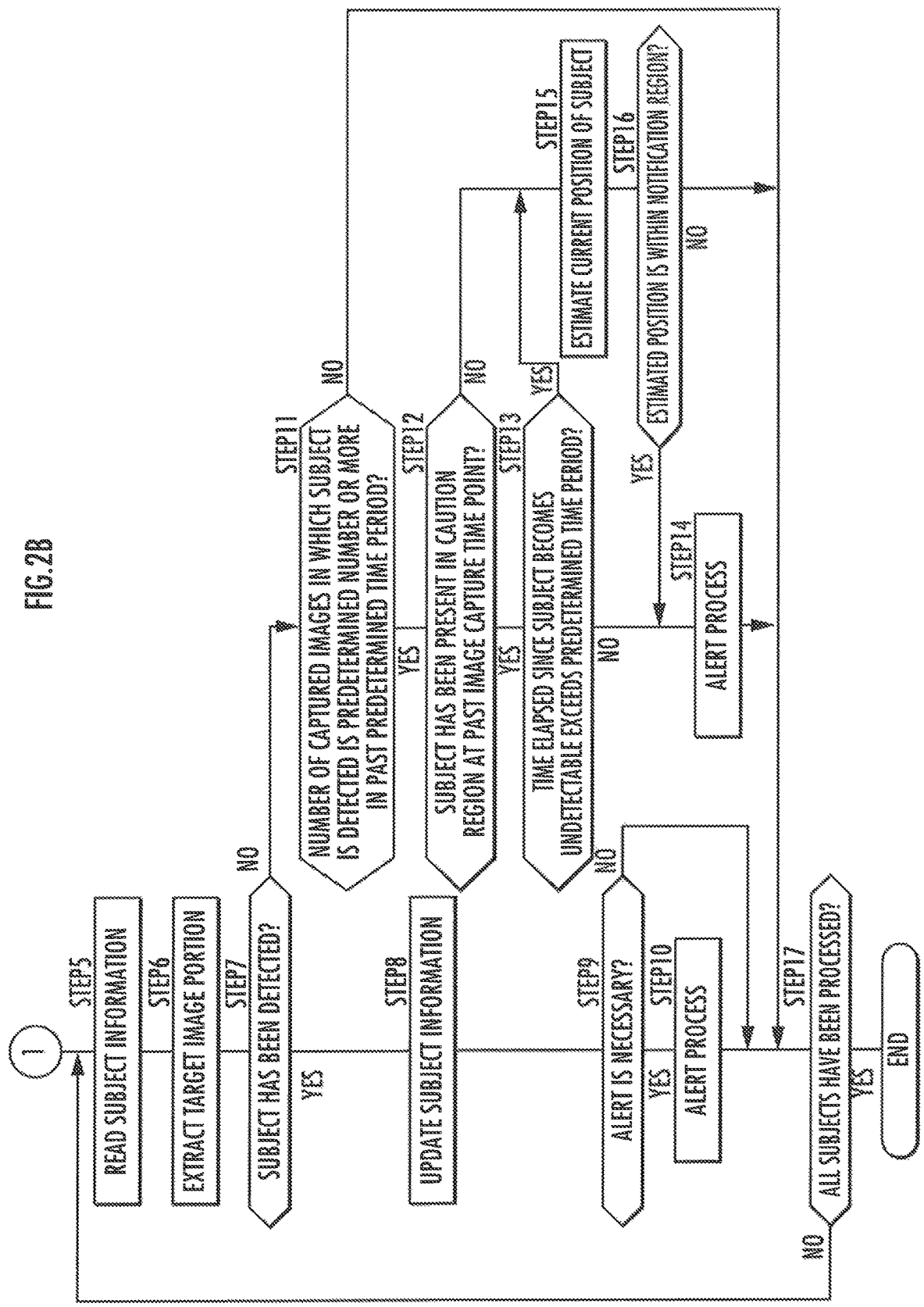

Embodiments of a vehicle periphery monitoring device according to the present invention will be described with reference to FIG. 1 to FIG. 3.

(Configuration of Vehicle Periphery Monitoring Device)

Referring to FIG. 1, a vehicle periphery monitoring device 10 is installed in a vehicle 1 (corresponding to a vehicle of the present invention) including a camera 2 (color camera), a speed sensor 3, a speaker 5, and a display 6.

The vehicle periphery monitoring device 10 is an electronic unit constituted by a CPU, a memory, various interface circuits, and the like, which will not be illustrated, and the CPU executing a program for vehicle periphery monitoring that is held in the memory makes the vehicle periphery monitoring device function as an image acquisition unit 11, an edge image generation unit 12, a subject information acquisition unit 13, a target image portion extraction unit 14, an alert necessity determination unit 15, and a notification unit 16. In addition, the vehicle periphery monitoring device 10 implements a vehicle periphery monitoring method according to the present invention.

The subject information acquisition unit 13, the target image portion extraction unit 14, the alert necessity determination unit 15, and the notification unit 16 constitute an alert process unit of the present invention.

The vehicle periphery monitoring device 10 includes a storage unit 20 that is constituted by a memory or a hard disk. The storage unit 20 includes a captured image storage unit 21a, an edge image storage unit 21b, and a subject information storage unit 22.

(Vehicle Periphery Monitoring Processing)

There will be described below processing of, by the vehicle periphery monitoring device 10, detecting a monitored subject W that is present around the vehicle 1 and notifying a driver that the monitored subject W is present around the vehicle, according to a flowchart illustrated in FIG. 2A and FIG. 2B. The vehicle periphery monitoring device 10 performs the processing according to the flowchart illustrated in FIG. 2A and FIG. 2B at predetermined control cycles.

FIG. 2A/STEP 1 is a process performed by the image acquisition unit 11. The image acquisition unit 11 receives a picture signal of the front of the vehicle 1 (corresponding to the periphery of the vehicle of the present invention), the picture signal being output from the camera 2, and demosaic color components (R values, G values, and B values) of this picture signal to acquire a color captured image having R values, G values, and B values as data on individual pixels. The data on the captured image having been acquired is held in the captured image storage unit 21a.

The edge image generation unit 12 performs a process of converting color components of each pixel of a captured image saved in the captured image storage unit 21a into luminance to generate a gray scale image (multi-valued image) (FIG. 2A/STEP 2). Then, the edge image generation unit 12 extracts, from the gray scale image, edge points (pixels each of which has a luminance difference (the amount of change in luminance) with pixels of a periphery portion (an image portion) being a predetermined value or more. The edge points include positive edge points at which luminance changes from low to high, and negative edge points at which luminance changes from high to low) to generate an edge image, and saves the edge image in the edge image storage unit 21b (FIG. 2A/STEP 3).

Note that, in the case where the camera 2 is a monochrome camera, a gray-scale captured image can be acquired from the luminance of individual pixels, and thus the above-described process of generating a gray scale image from a color captured image is not needed.

Subsequent FIG. 2A/STEP 4 is a process performed by the target image portion extraction unit 14. The target image portion extraction unit 14 performs, for the edge image stored in the edge image storage unit 21b, labeling in which a bunch of edge points (hereafter, referred to as an edge portion) is labeled, and clustering in which adjacent edge portions are considered to be image portions of an identical object and associated with each other.

Subsequent FIG. 2B/STEP 5 is a process performed by the subject information acquisition unit 13. The subject information acquisition unit 13 acquires, from a plurality of pieces of subject information stored in the subject information storage unit 22, information on a solid body that is the closest to the vehicle 1 (solid body that has the shortest distance from the vehicle 1 (camera 2)), as information on the subject W.

Here, as the information on the subject W, there are read a center of gravity of the image portion of the subject W at the last image capture time point, an area of the image portion of the subject W, a real-space distance from the camera 2 to the subject W, an aspect ratio of a circumscribed rectangle of the image portion of the subject W (ASPECT ratio), and a relative speed of the subject W for the vehicle 1, out of past information on the subject W that is saved in the subject information storage unit 22 in the process of FIG. 2B/STEP 9 to be described later. Hereafter, these pieces of information will be referred to as, respectively, a past center of gravity, a past area, a past distance, a past aspect ratio, and a past speed.

FIG. 2B/STEP 6 is a process performed by the target image portion extraction unit 14. The target image portion extraction unit 14 extracts, from a latest captured image (the edge image) generated in FIG. 2A/STEP 3, the image portion of a subject W that is identical to the subject W acquired by the subject information acquisition unit 13.

In more detail, the target image portion extraction unit 14 refers to the edge image storage unit 21b and extracts an image portion, in the latest captured image generated in FIG. 2A/STEP 3, that satisfies all the following requirements (a), (b), and (c).

Note that, for each image portion of the latest image generated in FIG. 2A/STEP 3, a center of gravity of the image portion, an area of the image portion, a real-space distance from the camera 2 to the subject W that corresponds to the image portion, an aspect ratio of a circumscribed rectangle of the image portion (ASPECT ratio), and a relative speed of the subject W for the vehicle 1 will be, respectively, referred to as a latest center of gravity, a latest area, a latest distance, a latest aspect ratio, and a latest speed. As the relative speed of the subject W for the vehicle 1, the speed of the vehicle 1 indicated on the speed sensor 3 may be adopted.

(a) To satisfy the relationships of the following expression (1) and expression (2), assuming that the position coordinates of a past center of gravity are denoted as (x0, y0) and the position coordinates of a latest center of gravity are denoted as (x1, y1).

$$|x1-x0|<Px \quad (1)$$

where Px is an allowance of the amount of movement on an image in an x direction (horizontal direction).

$$|y1-y0|<Py \quad (2)$$

where Py is an allowance of the amount of movement on the image in a y direction (vertical direction).

(b) To satisfy the relation of the following expression (3), assuming that a past area is denoted as S0, and a latest area is denoted as S1.

[Expression 3]

$$1-Ps < \frac{S1}{S0} < 1+Ps \quad (3)$$

where Ps is an allowance of an area change.

(c) To satisfy the relation of the following expression (4), assuming that a past aspect ratio is denoted as AS0, and a latest aspect ratio is denoted as AS1.

[Expression 4]

$$1-Pas < \frac{AS1}{AS0} < 1+Pas \quad (4)$$

where Pas is an allowance of an aspect ratio change.

In subsequent FIG. 2B/STEP 7, the target image portion extraction unit 14 determines whether or not extraction of the image portion of an object that is identical to the subject W acquired by the subject information acquisition unit 13 has succeeded.

If the determination results in the affirmative (YES in FIG. 2B/STEP 7), the target image portion extraction unit 14 stores the latest center of gravity, the latest area, the latest distance, the latest aspect ratio, and latest speed in the subject information storage unit 22 (FIG. 2B/STEP 8). In subsequent FIG. 2B/STEP 9, the alert necessity determination unit 15 determines, based on the latest center of gravity, the latest area, the latest distance, the latest aspect ratio, and the latest speed, whether or not there is the possibility that the subject W comes into contact with the vehicle 1. If the determination results in the affirmative (YES in FIG. 2B/STEP 9), the notification unit 16 warns a driver, via at least one of the speaker 5 and the display 6, about the fact that the subject W having the possibility of coming into contact with the vehicle 1 is present around the vehicle 1 (FIG. 2B/STEP 10).

On the other hand, if the determination in FIG. 2B/STEP 7 results in the negative (NO in FIG. 2B/STEP 7), the alert necessity determination unit 15 refers to the information on the subject W stored in the subject information storage unit 22 and determines whether or not the number of captured images in which the subject W is detected is a predetermined number or more, out of a plurality of captured images in a predetermined past time period (FIG. 2B/STEP 11).

If the determination results in the negative (NO in FIG. 2B/STEP 11), the vehicle periphery monitoring device 10 performs the processes starting with FIG. 2B/STEP 17.

If the determination results in the affirmative (YES in FIG. 2B/STEP 11), the alert necessity determination unit 15 determines whether or not the subject W at a past image capture time point is present in a predetermined caution region D1 in the real space (FIG. 2B/STEP 12). The caution region D1 is a region predetermined toward the front of the vehicle 1, and in the present embodiment, the region has a length d1 in a traveling direction of the vehicle 1 and a length w1 in a width direction of the vehicle 1, as illustrated in FIG. 3A.

The length d1 in the traveling direction of the vehicle 1 is set so as to be a length longer than a distance up to a region in which the camera 2 is no longer able to capture a whole-body image of a pedestrian. Note that the distance at which a whole-body image of a pedestrian cannot be captured is experimentally found and determined.

In addition, the length w1 in the width direction of the vehicle 1 is set as a length that is equal to the width of the vehicle 1 or slightly shorter than the width.

If the determination results in the affirmative (YES in FIG. 2B/STEP 12), the alert necessity determination unit 15 determines whether or not a time elapsed since the subject W becomes not able to be detected in FIG. 2B/STEP 7 exceeds a predetermined time period (FIG. 2B/STEP 13).

If the determination results in the negative (NO in FIG. 2B/STEP 13), the notification unit 16 warns a driver, via at least one of the speaker 5 and the display 6, about the fact the subject W having the possibility of coming into contact with the vehicle 1 is present around the vehicle 1 (FIG. 2B/STEP 14). That is, in the present embodiment, the case where the determination in FIG. 2B/STEP 13 resulting in the negative means the case where the subject W is not noise, and the subject W moves very little from a position in the last detection (the caution region D1), since the subject W is detected a predetermined number of times or more in a past predetermined time period (YES in FIG. 2B/STEP 11), the subject W in the last detection is present in the caution region D1 (YES in FIG. 2B/STEP 12), and a time elapsed since the subject W becomes undetectable is within the predetermined time period (NO in FIG. 2B/STEP 13). Meanwhile, since the vehicle 1 moves forward, the subject W is estimated to be present in a notification region D2 that is forward of the vehicle 1. For this reason, the notification unit 16 warns the driver via at least one of the speaker 5 and the display 6.

In contrast, if the determination in FIG. 2B/STEP 12 results in the negative (NO in FIG. 2B/STEP 12), or the determination in FIG. 2B/STEP 13 results in the affirmative (YES in FIG. 2B/STEP 13), the alert necessity determination unit 15 estimates a current position of the subject W based on the past distance and the past speed (FIG. 2B/STEP 15). The alert necessity determination unit 15 may estimate the current position of the subject W based on a current speed of the vehicle 1 indicated on the speed sensor 3 rather than based on the past speed.

In subsequent FIG. 2B/STEP 16, the alert necessity determination unit 15 determines whether or not the position of the subject W estimated in FIG. 2B/STEP 15 is included in the notification region D2.

The notification region D2 is a region predetermined toward the front of the vehicle 1, and in the present embodiment, the region has a length d2 in the traveling direction of the vehicle 1 and a length w2 in the width direction of the vehicle 1, as illustrated in FIG. 3B.

The length d2 in the traveling direction of the vehicle 1 is set so as to be a length shorter than the distance up to the region in which the camera 2 is no longer able to capture a whole-body image of a pedestrian. Note that the distance at which a whole-body image of a pedestrian cannot be captured is experimentally found and determined.

In addition, the length w2 in the width direction of the vehicle 1 is set as a length that is equal to the width of the vehicle 1.

If the determination results in the affirmative (YES in FIG. 2B/STEP 16), the notification unit 16 warns the driver, via at least one of the speaker 5 and the display 6, about the fact the subject W having the possibility of coming into contact with the vehicle 1 is present around the vehicle 1 (FIG. 2B/STEP 14).

If the determination in FIG. 2B/STEP 11 results in the negative (NO in FIG. 2B/STEP 11), or the determination in FIG. 2B/STEP 16 results in the negative (NO in FIG. 2B/STEP 16) after the process of FIG. 2B/STEP 14, or after the process of FIG. 2B/STEP 10, the target image portion extraction unit 14 determines whether or not the processes of FIG. 2B/STEPS to FIG. 2B/STEP 16 have been performed for all the subjects W stored in the subject information storage unit 22 (FIG. 2B/STEP 17). If the determination results in the negative (NO in FIG. 2B/STEP 17), the vehicle periphery monitoring device 10 performs the processes starting with FIG. 2B/STEP 5 on an unprocessed subject W. If the determination results in the affirmative (YES in FIG. 2B/STEP 17), the vehicle periphery monitoring device 10 ends the processes of the vehicle periphery monitoring processing at this cycle.

Note that FIG. 2B/STEP 5 to FIG. 2B/STEP 7 and FIG. 2B/STEP 11 to FIG. 2B/STEP 16 correspond to an alert process step of the present invention.

(Operational Advantages of the Present Embodiment)

According to the vehicle periphery monitoring device 10 having the configuration, even if a monitored subject W is not detected from a latest captured image (NO in FIG. 2B/STEP 7), a notification is provided to a driver when it is estimated based on a past captured image that the monitored subject W is present in the notification region D2 (YES in FIG. 2B/STEP 11, YES in FIG. 2B/STEP 12 and NO in FIG. 2B/STEP 13, or YES in FIG. 2B/STEP 16). As a result, the analysis of a latest captured image to detect the undetected monitored subject W becomes unnecessary, and it is thus possible to appropriately notify the driver of the presence of the monitored subject W while suppressing computational complexity and the amount of memory usage.

According to the vehicle periphery monitoring device 10 having the configuration, as to a monitored subject W that is present in the vicinity of an own vehicle at a past image capture time point, the monitored subject W is estimated to be present in the notification region D2 at a latest image capture time point on the condition that other requirements are satisfied (see the processes starting with YES in FIG. 2B/STEP 12), and it is thus possible to notify the driver of the presence of the monitored subject W more appropriately.

According to the vehicle periphery monitoring device 10 having the configuration, since the monitored subject W is estimated to be present in the notification region D2 on the condition that other requirements are satisfied in the case where the number of times at which a monitored subject W is detected from a captured image is the predetermined number of times or more in a past predetermined time period, a notification is made when there is a high probability that the monitored subject W is actually present in the notification region D2. Therefore, according to the vehicle periphery monitoring device 10 having the configuration, it is possible to notify a driver of the presence of the monitored subject W more appropriately.

Even when the monitored subject W has been detected in the past, the probability of the presence of the monitored subject W in the notification region D2 decreases with time.

According to the vehicle periphery monitoring device 10 having the configuration that is made with this regard brought into focus, when a time elapsed since the monitored subject W becomes undetectable is the predetermined time period or shorter, the monitored subject W is estimated to be present in the notification region D2 on the condition that other requirements are satisfied (NO in FIG. 2B/STEP 13). With this configuration, it is possible to notify a driver when there is a high probability that the monitored subject W is actually present in the notification region D2.

According to the vehicle periphery monitoring device 10 having the configuration, it is estimated, based on the relative speed to the vehicle 1, whether or not the monitored subject W is present in the notification region D2 (FIG. 2B/STEP 15 to FIG. 2B/STEP 16). As a result, even if the monitored subject W is a moving object, it is estimated whether or not the monitored subject W is present in the notification region D2, with high accuracy.

In addition, in the present embodiment, the alert process is performed if the monitored subject W is present in the caution region D1 at a past image capture time point (YES in FIG. 2B/STEP 12), and a time elapsed since the monitored subject W becomes undetectable is the predetermined time period or shorter (NO in FIG. 2B/STEP 13). In addition, the position of the monitored subject W at a latest image capture time point is estimated and thereafter it is determined whether or not to perform the alert process (FIG. 2B/STEP 15 to FIG. 2B/STEP 16) if the monitored subject W is absent in the caution region D1 at the past image capture time point (NO in FIG. 2B/STEP 12), or the time elapsed since the monitored subject W becomes undetectable is the predetermined time period or more (YES in FIG. 2B/STEP 13).

This is because, if the monitored subject W is present in the caution region D1 at the past image capture time point (YES in FIG. 2B/STEP 12), and a time elapsed since the monitored subject W becomes undetectable is the predetermined time period or shorter (NO in FIG. 2B/STEP 13), it is inferred that the monitored subject W is present in the region (notification region D2) where there is the possibility that the monitored subject W comes into contact with the vehicle 1 at the latest image capture time point, irrespective of the amount of movement of the monitored subject W, and thus there is a necessity to notify the driver. On the other hand, if the monitored subject W is absent in the caution region D1 at the past image capture time point (NO in FIG. 2B/STEP 12), or the time elapsed since the monitored subject W becomes undetectable is the predetermined time period or longer (YES in FIG. 2B/STEP 13), there is the possibility that the monitored subject W is present in the notification region D2 where there is the possibility that the vehicle 1 comes contact with the monitored subject W depending on the amount of movement of the monitored subject W with respect to the vehicle 1. For this reason, the alert necessity determination unit 15 estimates the position of the monitored subject W at the latest image capture time point based on the past distance and the past speed of the monitored subject W (FIG. 2B/STEP 16). By these processes, it is possible to appropriately alert the driver while reducing an unnecessary alert process.

Other Embodiments

Some of the processes of FIG. 2B/STEP 11 to FIG. 2B/STEP 13 and FIG. 2B/STEP 15 to FIG. 2B/STEP 16 may be omitted.

The process of FIG. 2B/STEP 12 may be performed after the processes of FIG. 2B/STEP 15 and FIG. 2B/STEP 16.

REFERENCE SIGNS LIST 1 vehicle (own vehicle)
2 camera
3 speed sensor
10 vehicle periphery monitoring device
13 subject information acquisition unit
14 target image portion extraction unit
15 alert necessity determination unit
16 notification unit
W subject (monitored subject)
D2 notification region

The invention claimed is:

1. A vehicle periphery monitoring device which detects a whole-body image of a pedestrian included in captured images of a periphery of an own vehicle at a plurality of time points acquired by a camera and identifies the whole-body image of the pedestrian as a monitored subject, and notifies a driver of the own vehicle that the monitored subject is present in the periphery of the own vehicle, the vehicle periphery monitoring device comprising, an alert process unit that, in a case where the monitored subject detected in a caution region in a real space based on a past captured image is not detected in the caution region in a latest captured image, estimates whether or not the monitored subject is present in a notification region in a real space based on the past captured image, the caution region being included in an image capture range of the camera and having a length in a traveling direction of the own vehicle being set to a length longer than a predetermined distance at which the camera is no longer able to capture the whole-body image of the pedestrian, and the notification region being included in an image capture range of the camera and having a length in the traveling direction of the own vehicle being set to a length shorter than the predetermined distance, and that notifies the driver when the monitored subject is estimated to be present in the notification region, wherein a count of the captured images in which the subject is detected is a predetermined number or more in the predetermined time period, and wherein an amount of time elapsed since the subject becomes undetectable in the caution region is within a predetermined elapsed time period.

2. The vehicle periphery monitoring device according to claim 1, wherein the alert process unit estimates that the monitored subject is present in the notification region in a case at least one of requirements is satisfied between a requirement that a distance in a traveling direction of the own vehicle between the monitored subject detected from the past captured image and the own vehicle is a predetermined first distance or less; and a requirement that a distance in a width direction of the own vehicle between the monitored subject and the own vehicle is a predetermined second distance or less.

3. The vehicle periphery monitoring device according to claim 1, wherein the alert process unit estimates that the monitored subject is present in the notification region in a case a number of times at which the monitored subject is detected from a captured image is a predetermined number of times or more in a past predetermined time period.

4. The vehicle periphery monitoring device according to claim 1, wherein the alert process unit estimates that the monitored subject is present in the notification region in a case a time elapsed since the monitored subject becomes undetectable is a predetermined time period or less.

5. The vehicle periphery monitoring device according to claim 1, wherein the alert process unit estimates whether or not the monitored subject is currently present in the notification region based on a relative speed of the monitored subject detected in the past captured image with respect to the own vehicle.

6. A vehicle which detect a whole-body image of a pedestrian included in captured images of a periphery of an own vehicle at a plurality of time points acquired by a camera and identifies the whole-body image of the pedestrian as a monitored subject, and notifies a driver of the own vehicle that the monitored subject is present in the periphery of the own vehicle, the vehicle comprising, an alert process unit which, in a case where the monitored subject detected in a caution region in a real space based on a past captured image is not detected in the caution region in a latest captured image, estimates whether or not the monitored subject is present in a notification region in a real space based on the past captured image, the caution region being included in an image capture range of the camera and having a length in a traveling direction of the own vehicle being set to a length longer than a predetermined distance at which the camera is no longer able to capture the whole-body image of the pedestrian, and the notification region being included in an image capture range of the camera and having a length in the traveling direction of the own vehicle being set to a length shorter than the predetermined distance, and notifies the driver in a case the monitored subject is estimated to be present in the notification region, wherein a count of the captured images in which the subject is detected is a predetermined number or more in the predetermined time period, and wherein an amount of time elapsed since the subject becomes undetectable in the caution region is within a predetermined elapsed time period.

7. A vehicle periphery monitoring method in which a whole-body image of a pedestrian is included in captured images of a periphery of an own vehicle at a plurality of time points acquired by a camera and the whole-body image of the pedestrian is identified as a monitored subject, and a driver of the own vehicle is notified that the monitored subject is present in the periphery of the own vehicle, the method comprising an alert process step of, in a case where the monitored subject detected in a caution region in a real space based on a past captured image is not detected in the caution region in a latest captured image, estimating whether or not the monitored subject is present in a notification region in a real space based on the past captured image, the caution region being included in an image capture range of the camera and having a length in a traveling direction of the own vehicle being set to a length longer than a predetermined distance at which the camera is no longer able to capture the whole-body image of the pedestrian, and the notification region being included in an image capture range of the camera and having a length in the traveling direction of the own vehicle being set to a length shorter than the predetermined distance, and notifying the driver when the monitored subject is estimated to be present in the notification region, wherein a count of the captured images in which the subject is detected is a predetermined number or more in the predetermined time period, and wherein an amount of time elapsed since the subject becomes undetectable in the caution region is within a predetermined elapsed time period.

\* \* \* \* \*